(12) United States Patent
Ninan et al.

(10) Patent No.: US 10,853,585 B2
(45) Date of Patent: Dec. 1, 2020

(54) METHOD AND APPARATUS FOR GENERATING CAUSAL EXPLANATIONS USING MODELS DERIVED FROM DATA

(71) Applicant: Arria Data2Text Limited, Aberdeen (GB)

(72) Inventors: Nikhil Ninan, Aberdeen (GB); William A. Bradshaw, Aberdeen (GB); Gowri Somayajulu Sripada, Westhill (GB)

(73) Assignee: Arria Data2Text Limited, Aberdeen (GB)

( * ) Notice: Subject to any disclaimer, the term of this patent is extended or adjusted under 35 U.S.C. 154(b) by 0 days.

(21) Appl. No.: 15/458,532

(22) Filed: Mar. 14, 2017

(65) Prior Publication Data

US 2017/0270105 A1    Sep. 21, 2017

Related U.S. Application Data

(60) Provisional application No. 62/308,842, filed on Mar. 15, 2016, provisional application No. 62/309,059, filed on Mar. 16, 2016.

(51) Int. Cl.
```
G06F 40/56      (2020.01)
G06N 5/02       (2006.01)
G06F 40/169     (2020.01)
```

(52) U.S. Cl.
CPC .......... *G06F 40/56* (2020.01); *G06N 5/022* (2013.01); *G06F 40/169* (2020.01)

(58) Field of Classification Search
CPC ................................................ G06F 17/2881
USPC ........................................................ 704/9
See application file for complete search history.

(56) References Cited

U.S. PATENT DOCUMENTS

| 7,167,824 B2 * | 1/2007 | Kallulli ................. G10L 13/02 704/8 |
| 8,037,000 B2 * | 10/2011 | Delmonico ............ G06N 5/045 706/45 |
| 8,355,903 B1 * | 1/2013 | Birnbaum ............... G06F 17/24 704/1 |

(Continued)

OTHER PUBLICATIONS

Reiter, E. et al., *Building Natural Language Generation Systems*, Cambridge University Press (2000) 138 pages.

*Primary Examiner* — Shaun Roberts
(74) *Attorney, Agent, or Firm* — Alston & Bird LLP

(57) ABSTRACT

Methods, apparatuses, and computer program product are described herein configured to transform an input model into a format that can be expressed causally in one or more phrases with a narrative representation. The methods, apparatuses, and computer program product may be configured to obtain the input model representing a data set composed of a plurality of nodes, a plurality of edges, and a plurality of paths and identify a path of maximal significance. The methods, apparatuses, and computer program product include identifying a subset of nodes from the plurality of nodes and a subset of edges from the plurality of edges associated with the path of maximal significance. The methods, apparatuses, and computer program product are configured to generate, using a natural language generation system, one or more phrases with a narrative representation describing the subset of nodes and the subset of edges associated with the path of maximal significance.

20 Claims, 7 Drawing Sheets

(56) References Cited

U.S. PATENT DOCUMENTS

| | | | | |
|---|---|---|---|---|
| 8,762,134 B2* | 6/2014 | Reiter | .................... | G06F 17/28 |
| | | | | 340/573.1 |
| 10,078,634 B2* | 9/2018 | Gou | .................... | G06F 17/2705 |
| 2004/0111255 A1* | 6/2004 | Huerta | .................. | G06F 17/278 |
| | | | | 704/10 |
| 2010/0203970 A1* | 8/2010 | Hope | ................ | G06F 17/30056 |
| | | | | 463/42 |
| 2011/0087486 A1* | 4/2011 | Schiller | ................. | G06Q 40/06 |
| | | | | 704/9 |
| 2013/0174026 A1* | 7/2013 | Locke | ................... | G06Q 10/10 |
| | | | | 715/254 |
| 2013/0185050 A1* | 7/2013 | Bird | ................. | G06F 17/30654 |
| | | | | 704/2 |

* cited by examiner

Maximal Path

Pruned Path

Collapsed Path

METHOD AND APPARATUS FOR GENERATING CAUSAL EXPLANATIONS USING MODELS DERIVED FROM DATA

CROSS REFERENCE TO RELATED APPLICATIONS

This application claims the benefit of U.S. Provisional Patent Application No. 62/308,842 filed Mar. 15, 2016 and Provisional Patent Application No. 62/309,059 filed Mar. 16, 2016, the entire contents of which are incorporated herein by reference.

TECHNOLOGICAL FIELD

Embodiments of the present invention relate generally to natural language generation technologies and, more particularly, relate to a method, apparatus, and computer program product for textually and visually describing causal explanations between data to determine probability inferences.

BACKGROUND

In some examples, a natural language generation (NLG) system is configured to transform an input model that is expressed in a non-linguistic format into a format that can be expressed linguistically, such as through the use of natural language. For example, raw input data may take the form of an input model representing sales data over time and, as such, the raw input data may include data that is suggestive of a time, a duration, a value and/or the like. Therefore, an NLG system may be configured to input the input model and output text that linguistically describes causal explanations between marketing data and sales data so that rises and falls in sales can be explained in terms of related business activities such as marketing campaigns. For example, "Phase 2 skin care sales rose steadily in the United Kingdom through most of first quarter of the year, before sliding downhill towards the end of the first quarter of the year."

Data that is input into a NLG system may be provided in various models such as a tree model. The tree model may comprise a plurality of hierarchically and sequentially arranged paths representing a corresponding set of data. The set may be broken down into subsets of data, which can be further broken down into sub-subsets of data and so on. In some examples, the sets and subsequent subsets of data may include numerical content, symbolic content or the like. Symbolic content may include, but is not limited to, alphanumeric and other non-numeric character sequences in any character encoding, used to represent arbitrary elements of information. Furthermore, embodiments of the causal explanation system include a process flow to output, using the NLG system, text in a natural language (e.g. English, Japanese or Swahili), but may also be in the form of synthesized speech.

BRIEF SUMMARY

Methods, apparatuses, and computer program product are described herein that are configured to transform an input model into a format that can be expressed causally in one or more phrases with a narrative representation of the input model. In an example embodiment, a method is provided comprising obtaining the input model representing a data set composed of a plurality of nodes, a plurality of edges, and a plurality of paths. The method further comprises identifying a path of maximal significance from the plurality of paths. The method also include identifying a subset of nodes from the plurality of nodes and a subset of edges from the plurality of edges associated with the path of maximal significance. In an example embodiment, the method further comprises generating, using a natural language generation system that is configured to execute on a processor, one or more phrases with a narrative representation describing the subset of nodes and the subset of edges associated with the path of maximal significance. The method further comprises generating visualizations based upon the subset of nodes from the input model. In some embodiments, the input model is created manually or automatically by machine learning and data mining algorithms.

The method of this example embodiment also includes receiving threshold parameters, assigning an importance level to the plurality of paths corresponding to the data set of the input model, and identifying the path of maximal significance based upon the received threshold parameters, wherein the path of maximal significance is a path from the plurality of paths that exceeds the received threshold parameters.

In accordance with yet another example embodiment, the method further includes identifying the subset of nodes from the plurality of nodes and the subset of edges from the plurality of edges associated with the path of maximal significance based on a hierarchical relationship among a plurality of rules, wherein each of the plurality of rules comprises threshold parameters and an action to be executed if the threshold parameters are met.

In some example embodiments, the method may further comprise determining that a rule among the plurality of rules does not meet the threshold parameters and determining that the subset of nodes from the plurality of nodes and the subset of edges from the plurality of edges are insignificant, wherein the plurality of rules are a combination of features and values that characterize the subset of nodes from the plurality of nodes and the subset of edges from the plurality of edges of the input model.

In some example embodiments, the method may further comprise generating the one or more phrases by: mapping the subset of nodes and the subset of edges into the one or more phrases; grouping and aggregating the subset of nodes and the subset of edges; and ordering the nodes based on coherency, wherein the grouping and aggregating the subset of nodes and the subset of edges comprises generating a single phrase describing the subset of nodes and the subset of edges.

The method of this example embodiment also includes generating visualizations based upon the subset of nodes from the input model.

In accordance with yet another example embodiment, an apparatus is provided that includes at least one processor and at least one memory including computer program code, the at least one memory and the computer program code configured to, with the at least one processor, cause the apparatus to at least obtain an input model representing a data set composed of a plurality of nodes, a plurality of edges, and a plurality of paths. The apparatus is further caused to identify a path of maximal significance from the plurality of paths. The apparatus is further caused to identify a subset of nodes from the plurality of nodes and a subset of edges from the plurality of edges associated with the path of maximal significance. In an example embodiment, the apparatus is further caused to generate, using a natural language generation system that is configured to execute on a processor, one or more phrases with a narrative representation describing the subset of nodes and the subset of edges associated with the path of maximal significance. The apparatus is further caused to generate visualizations based upon the subset of nodes from the input model. In some embodiments, the input model is created manually or automatically by machine learning and data mining algorithms.

The apparatus of this example embodiment is also further caused to receive threshold parameters, assign an importance level to the plurality of paths corresponding to the data set of the input model, and identify the path of maximal significance based upon the received threshold parameters, wherein the path of maximal significance is a path from the plurality of paths that exceeds the received threshold parameters.

In accordance with yet another example embodiment, the apparatus if further caused to identify the subset of nodes from the plurality of nodes and the subset of edges from the plurality of edges associated with the path of maximal significance based on a hierarchical relationship among a plurality of rules, wherein each of the plurality of rules comprises threshold parameters and an action to be executed if the threshold parameters are met.

In some example embodiments, the apparatus may at least determine that a rule among the plurality of rules does not meet the threshold parameters and determine that the subset of nodes from the plurality of nodes and the subset of edges from the plurality of edges are insignificant, wherein the plurality of rules are a combination of features and values that characterize the subset of nodes from the plurality of nodes and the subset of edges from the plurality of edges of the input model.

In some example embodiments, the apparatus may further be caused to generate the one or more phrases by: mapping the subset of nodes and the subset of edges into the one or more phrases; grouping and aggregating the subset of nodes and the subset of edges; and ordering the nodes based on coherency, wherein the grouping and aggregating the subset of nodes and the subset of edges comprises generating a single phrase describing the subset of nodes and the subset of edges.

The apparatus of this example embodiment may be caused to generate visualizations based upon the subset of nodes from the input model.

In accordance with yet another example embodiment, a computer program product comprising a non-transitory memory medium having program code instructions stored thereon, the program code instructions which when executed by an apparatus causes the apparatus to at least obtain an input model representing a data set composed of a plurality of nodes, a plurality of edges, and a plurality of paths. The apparatus is further caused to identify a path of maximal significance from the plurality of paths. The computer program product is further caused to identify a subset of nodes from the plurality of nodes and a subset of edges from the plurality of edges associated with the path of maximal significance. In an example embodiment, the computer program product is further caused to generate, using a natural language generation system that is configured to execute on a processor, one or more phrases with a narrative representation describing the subset of nodes and the subset of edges associated with the path of maximal significance. The computer program product is further caused to generate visualizations based upon the subset of nodes from the input model. In some embodiments, the input model is created manually or automatically by machine learning and data mining algorithms.

The computer program product of this example embodiment is also further caused to receive threshold parameters, assign an importance level to the plurality of paths corresponding to the data set of the input model, and identify the path of maximal significance based upon the received threshold parameters, wherein the path of maximal significance is a path from the plurality of paths that exceeds the received threshold parameters.

In accordance with yet another example embodiment, the computer program product if further caused to identify the subset of nodes from the plurality of nodes and the subset of edges from the plurality of edges associated with the path of maximal significance based on a hierarchical relationship among a plurality of rules, wherein each of the plurality of rules comprises threshold parameters and an action to be executed if the threshold parameters are met.

In some example embodiments, the computer program product having program code instructions stored thereon, the program code instructions which when executed by an apparatus causes the apparatus at least to determine that a rule among the plurality of rules does not meet the threshold parameters and determine that the subset of nodes from the plurality of nodes and the subset of edges from the plurality of edges are insignificant, wherein the plurality of rules are a combination of features and values that characterize the subset of nodes from the plurality of nodes and the subset of edges from the plurality of edges of the input model.

In some example embodiments, the computer program product may further be caused to generate the one or more phrases by: mapping the subset of nodes and the subset of edges into the one or more phrases; grouping and aggregating the subset of nodes and the subset of edges; and ordering the nodes based on coherency, wherein the grouping and aggregating the subset of nodes and the subset of edges comprises generating a single phrase describing the subset of nodes and the subset of edges.

The computer program product of this example embodiment may be caused to generate visualizations based upon the subset of nodes from the input model.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
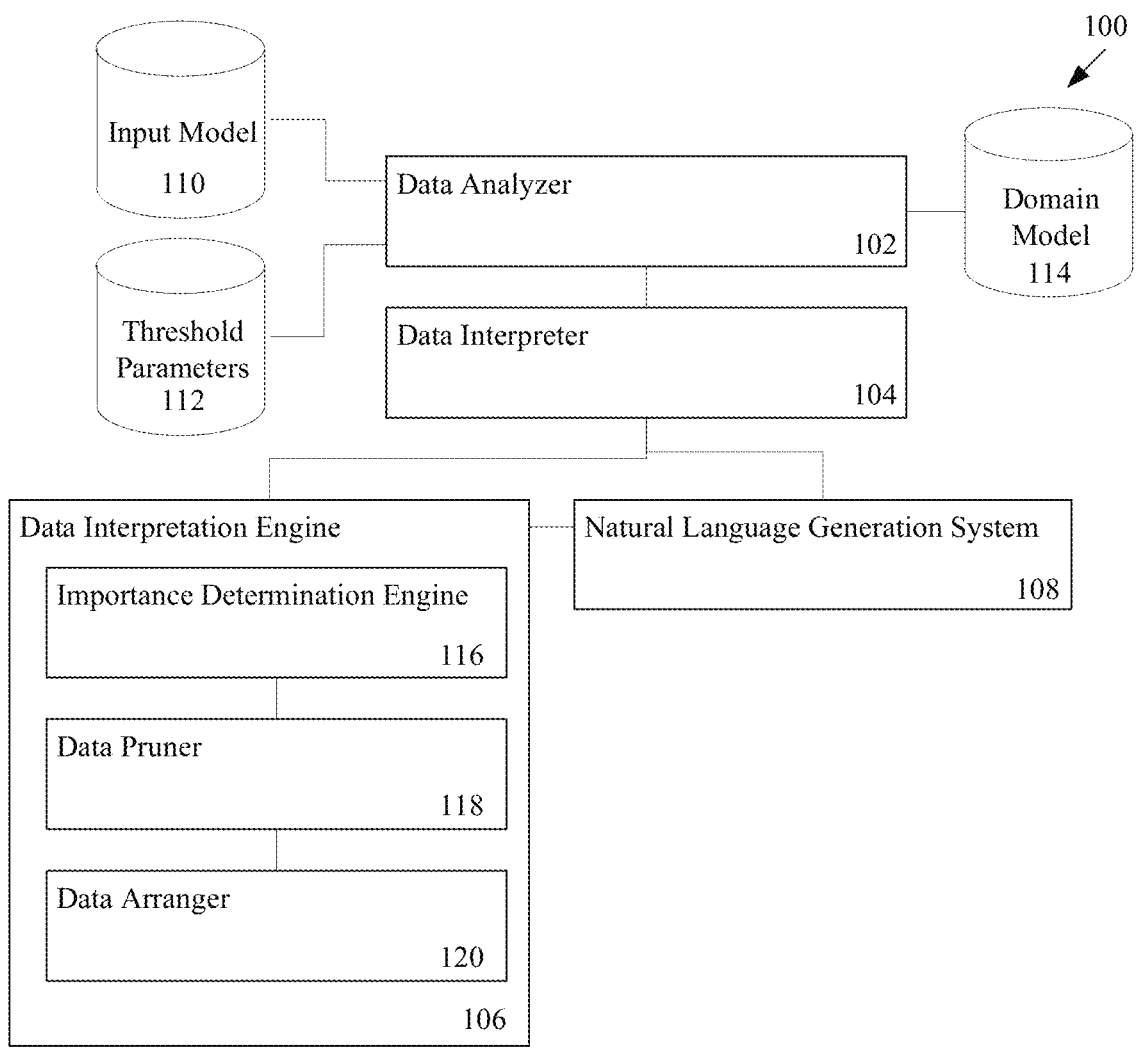
Figure 2A:
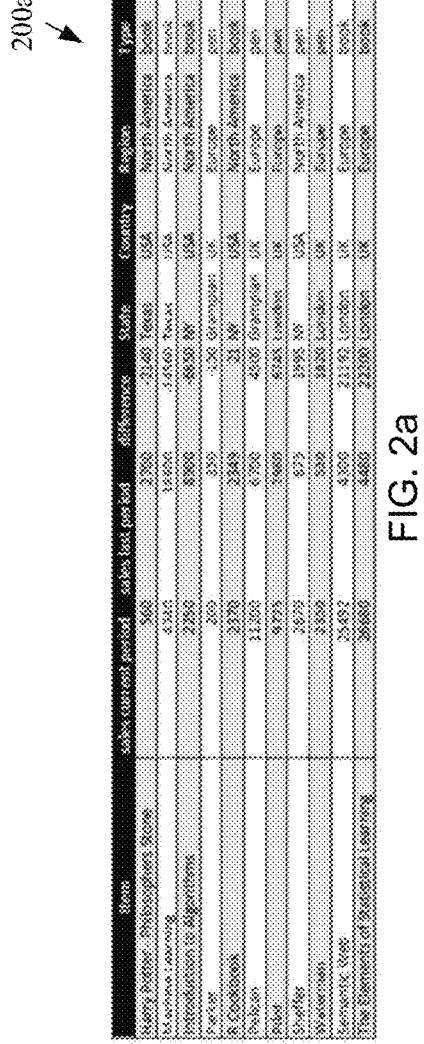
Figure 2B:
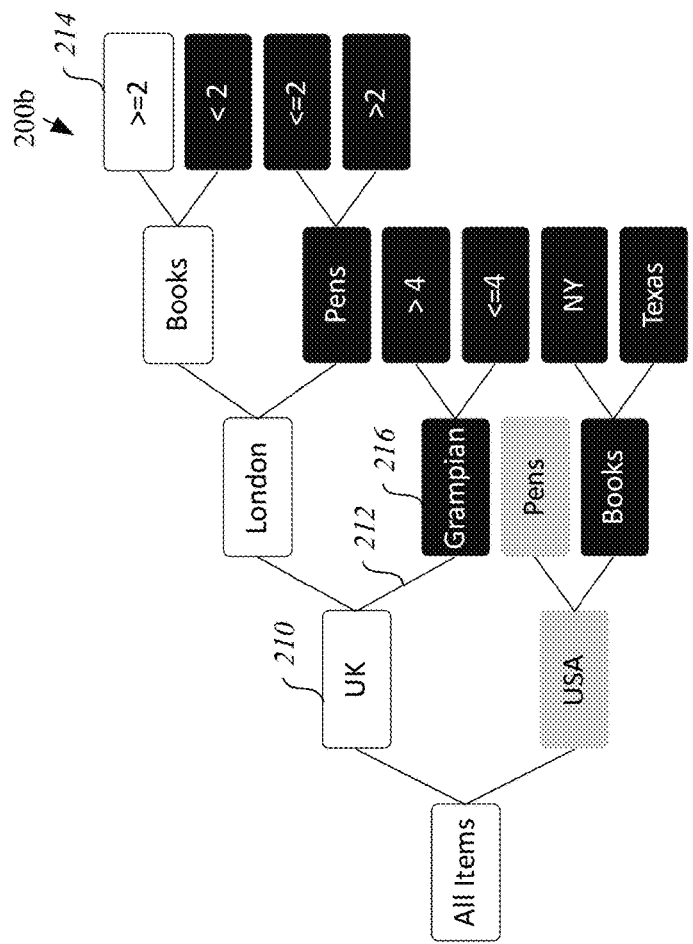
Figure 3:
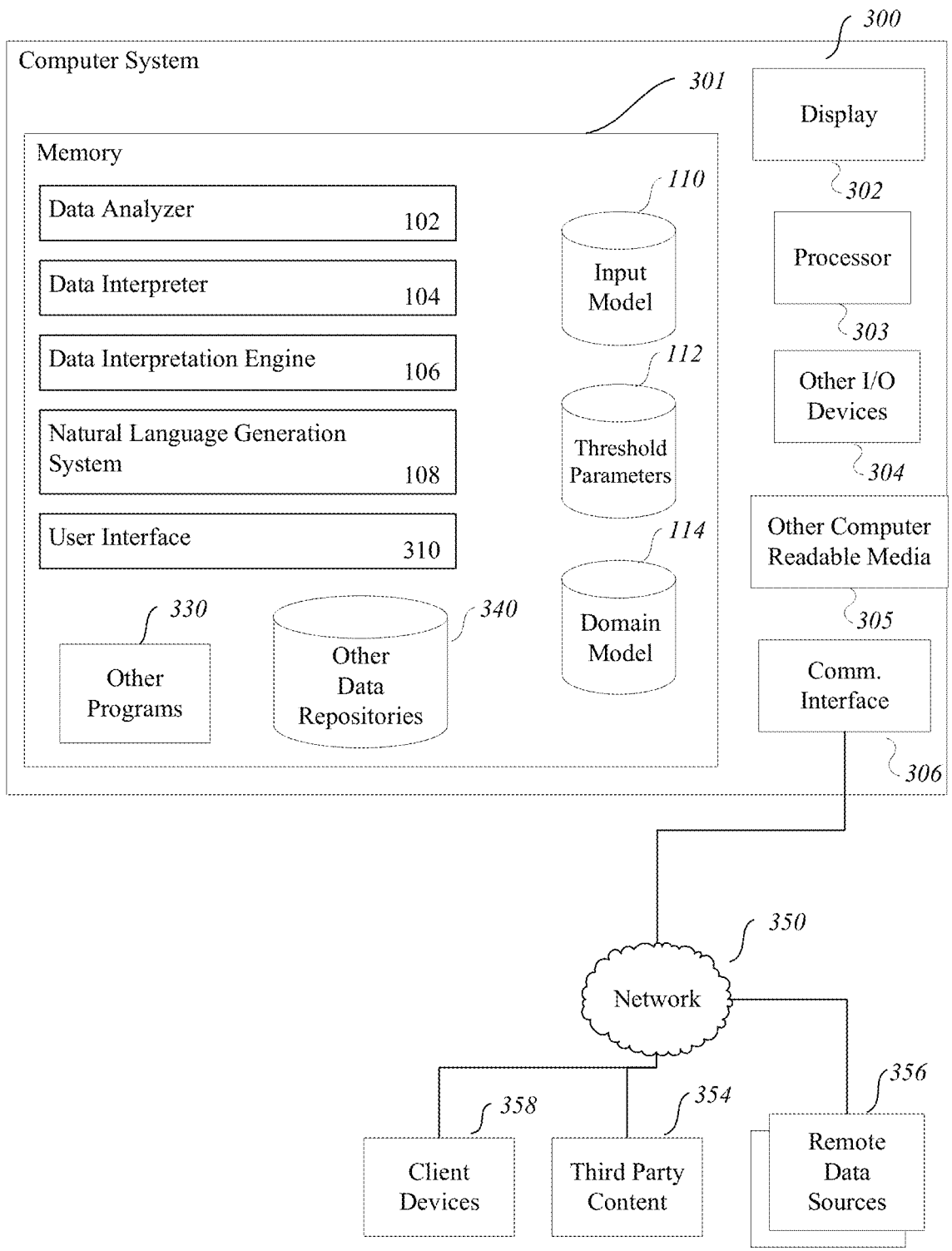
Figure 4:
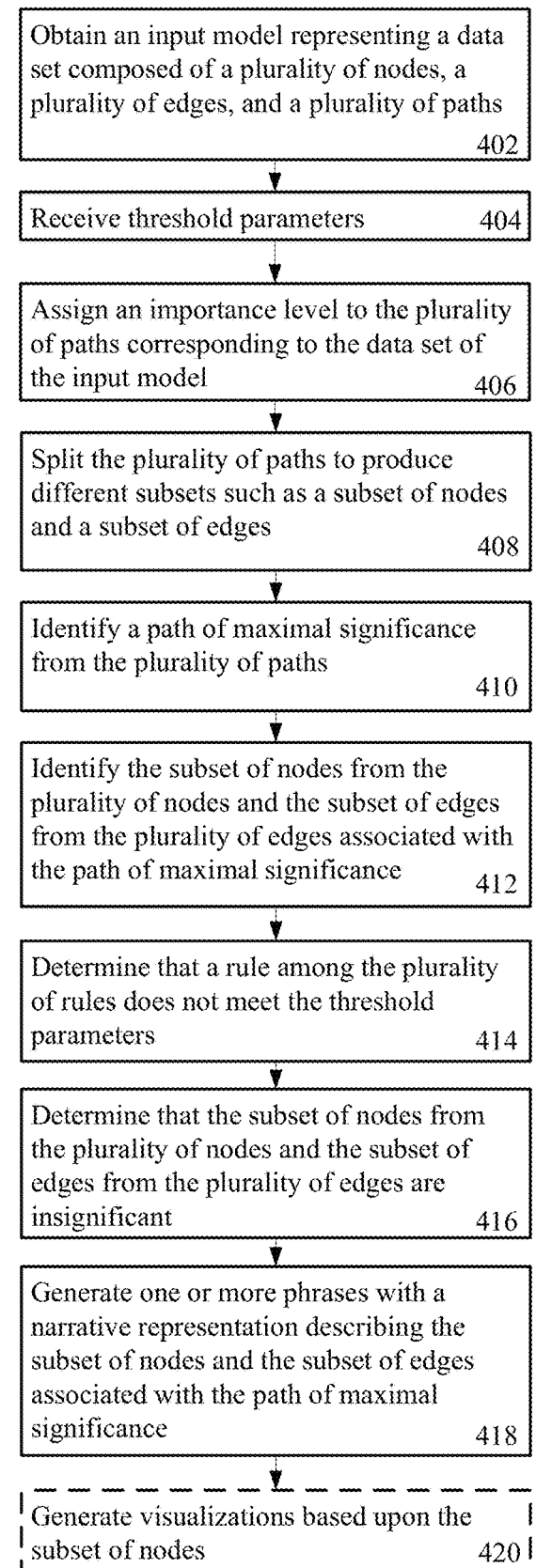
Figure 5:
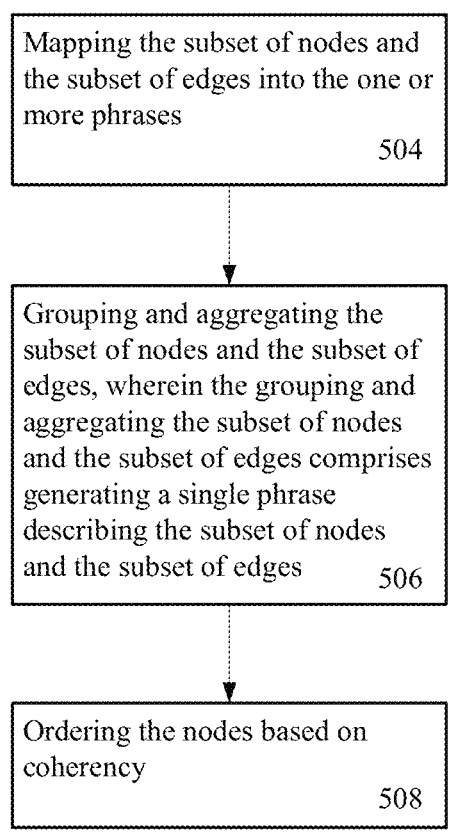
Figure 6:
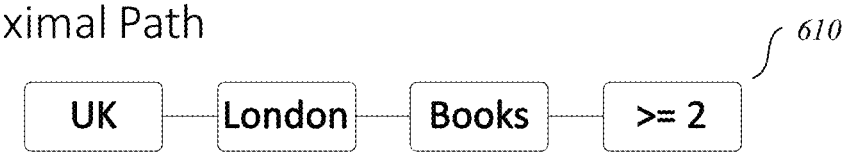
Figure 6:
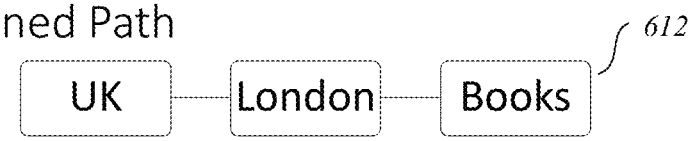
Figure 6:
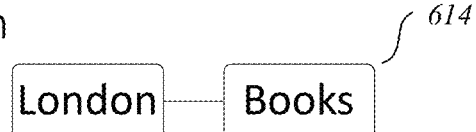
Figure 7A:
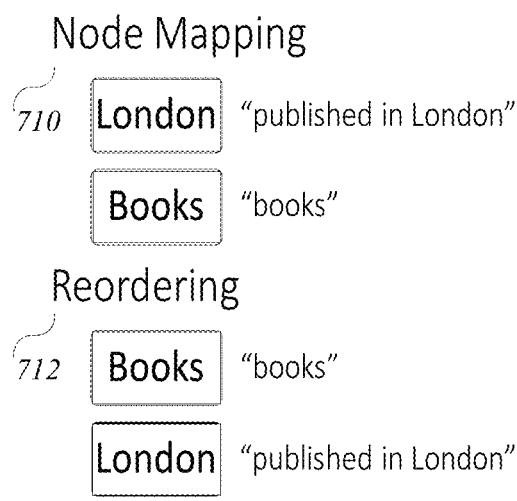
Figure 7B:
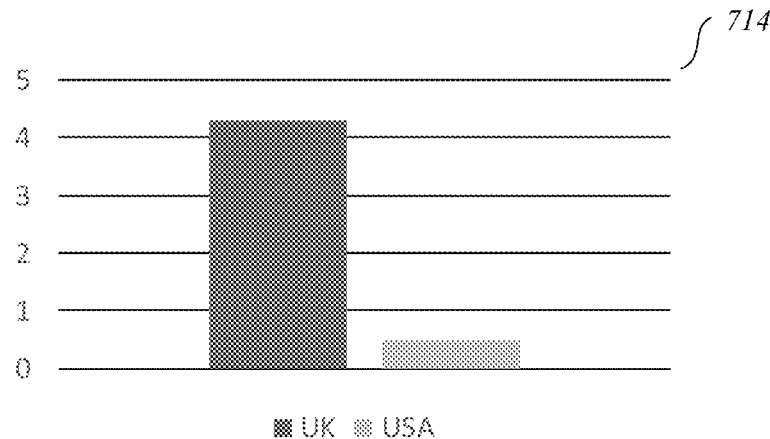

Having thus described embodiments of the invention in general terms, reference will now be made to the accompanying drawings, which are not necessarily drawn to scale, and wherein:

FIG. 1 is a schematic representation of a causal explanation system that may benefit from some example embodiments of the present invention;

FIGS. 2a and 2b illustrate two example sets of input models: tree model and table model;

FIG. 3 illustrates a block diagram of an apparatus that embodies a system in accordance with some example embodiments of the present invention;

FIGS. 4 and 5 illustrate flowcharts that may be performed by the system in accordance with some example embodiments of the present invention;

FIG. 6 illustrates embodiments of data interpretation according to example embodiments of the present invention; and FIGS. 7a and 7b illustrate embodiments of node mapping and node reordering according to example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention. The term visualization may be construed to comprise a graphical output that is configured to be displayable in a user interface, but may also describe an input into a graphing system such that a graph may be created for display in the user interface. As such, the terms visualization, graph or graphical output may be used interchangeably herein. Furthermore, the term narrative may be construed to comprise a plurality of phrases. As such, the terms narrative and phrases may be used interchangeably.

In some examples, systems that transform raw input into text are configured—generate textual descriptions of data focusing mainly on the behavior of the attributes of the data. That is, these behavioral descriptions highlight significant observable features in the data. For example, from sales data, a data-to-text system could auto-generate a textual description highlighting significant year-on-year or quarter-on-quarter changes. However, in some examples, organizations, users, and/or the like would like other data sources such as marketing data to be linked to sales data so that rises and falls in sales could be explained in terms of related business activities such as marketing campaigns.

In some cases, it is possible to derive models from data that establish causal links among multiple activities in a business. These models are currently presented visually, which in some cases may require users to interpret them for understanding the causal information.

In some example embodiments described herein, the apparatus, method and computer program product is configured to generate, using a natural language generation system, one or more phrases as textual output, in the form of a narrative, to describe a subset of data, such as a causal explanation (e.g., detection and linguistic description of subset of sales items that account for the observed sales rise). That is, the textual output may be configured to explain or otherwise describe a cause for a specific output, such as why sales have gone up or down. Such causal explanations may be generated based on an input causal model that was built based on machine learning, modeling, manually, and/or the like. Furthermore, the textual output and/or narrative may be further complemented with visualizations that highlight the causal explanations between the subset of data as well as significant differences between the subset of data.

Causal explanations may be defined as the relation between causes and effects. In other words, key events or factors that determine or drive activity. Causal explanations can further be interpreted to establish why and what may have caused a response or effect and/or understand how key events, and/or particular actions may impact events and/or objectives, both immediately and in the near future. In the current context, the ability to define and link key events or factors, as given a given set of data, is particularly useful in determining causal explanations. In some example embodiments described herein, given sets of data and further, subsets of data, and at least one metric (e.g. statistic) based on the data set, at least one causal explanation can link data sets based upon the value of the at least one metric. This process of automatically linking sets of data to determine causal explanations is the observable effect or response the user is interested requires. Embodiments of the current invention provide a computer system with the ability to analyze and translate the data so as to narratively explain such processes within the data set.

FIG. 1 is schematic representation of a causal explanation system 100. In some example embodiments, the system 100 comprises a data analyzer 102, a data interpreter 104, a data interpretation engine 106, a natural language generation system 108 and one or more data sources, such as but not limited to, input model 110, threshold parameters 112 and a domain model 114. In some example embodiments, historical data may also be accessed and/or otherwise analyzed. The data analyzer 102, the data interpreter 104, the data interpretation engine 106, an importance determination engine 116, a data pruner 118, and a data arranger 120 make take the form of, for example, a code module, a component, circuitry or the like. The components of the graphical annotation environment 100 are configured to provide various logic (e.g. code, instructions, functions, routines and/or the like) and/or services related to the generation one or more phrases with a narrative representation.

In some example embodiments, the data analyzer 102 is configured to input raw data, such as the raw data contained in the input model 110. The receipt or input of the raw input data may occur in response to a violation of a constraint (e.g. a data value over a threshold, within a threshold for a period of time and/or the like), a user input, a user request, or the like. For example, the raw data may be input if sales data satisfies a threshold, where the raw data may be suggestive of the cause of the rise/fall of the sales data. In other examples, the raw data may be input in response to an input or request, such as a request for details relating to a cause of a certain result. Alternatively or additionally the data analyzer 102 may be configured to receive or input raw input data continuously or semi-continuously, such as via a data stream, and determine an importance of the raw input data (e.g., whether the data violates a constraint, satisfies a threshold and/or the like).

A data interpreter, such as data interpreter 104, may be configured to input the raw data contained in the input model 110 and determine an importance level and/or relationships between the data. In order to determine the importance level and relationships, the data interpreter 104 may access the domain model 114 directly or indirectly via the data analyzer 102 or the like. The domain model 114 may contain information related to a particular domain or industry, and may be altered based on information received from a user input, a user request, or the like. For instance, if a user selects a timeframe beginning on 2010, information occurring prior to the year 2010 may be excluded from consideration, and accordingly the domain model 114 may only contain information related to the particular domain or industry that occurs on or after the year 2010. In some examples, the domain model 114 may provide data limits related to normal behaviors in a domain (e.g. normal ranges), information related to anomalous behaviors and/or the like. In other examples, the domain model 114 may describe relationships between various events and/or phenomena in data. For example, in a weather domain, the domain model 114 may indicate extreme weather in an instance in which wind speeds that are related to hurricane type events or temperatures that may cause harm to humans or other animals or may cause damage or interference to shipping in the data. Extreme weather events may be labeled as important, whereas typical temperatures may not be marked as important. In some example embodiments, each of the relationships between various events and/or phenomena in the data may be given an importance and/or otherwise may be weighted based on the importance level of the relationship between the various events and/or phenomena in the data.

Embodiments of the present disclosure provide for obtaining or otherwise ingesting an input model, such as input model 110. In some examples, the input model 110 make take the form of a data model that defines or otherwise described how data is connected, related, or should otherwise be processed. In further examples, a data model may be hierarchical/tree knowledge representation that includes rules that are a combination of features and values that characterize the underlying knowledge or data. As described above, the data model may include or may otherwise be suggestive as to a causal explanation.

In one example, an input model representing a set of information data as depicted in FIGS. 2a and 2b. FIG. 2a illustrates, for example, a data table model of sales items for a book store and corresponding data related to the sales items based on geographical region and published age. Specifically, FIG. 2a illustrates the item title, sales for the current period, sales for the last period, a difference in number of sales for the item in current year as compared to another time period, a state, a country, a region, an item type, and an age associated with the release of the item, for example. However, table 200a, does not provide a causal explanation for a change in sales between the current sales period and a second sales time period. Accordingly, and in examples not having the methods and systems described herein, a narrative describing the table would not provide a causal explanation for the increase in sales and which items may have contributed to the increase.

In another example, the data set is describable in view of an input model, such as a tree model 200b. The tree model 200b comprises a data set composed of a plurality of nodes 210, a plurality of edges 212, and a plurality of paths 214, the nodes represent content and the edges between the nodes represent a relationship between the nodes. For example, the node entitled London is the capital of node UK representing the United Kingdom. In another example, a path 214 identifies books with a published date greater than two years in London, United Kingdom. In some example embodiments, the tree model captures a set-subset relationship with each subset broken down further into sub-subsets. In some example embodiments, a subset is a portion of the tree where any node together with all the nodes below it comprises the subset. Accordingly, model 200b provides a model for describing sales items in terms of region of sales and age of the item.

The input model 110 may be input into the data interpretation engine 106 and the natural language system 108 to enable generation of the one or more phrases with a narrative representation based on the subsets of nodes and subset of edges. That is, in some examples, the data interpretation system may be configured to identify a maximal path, prune data to form pruned paths and remove data to form collapsed paths in preparation to generate a narrative which linguistically describes causal explanations of the data.

In some examples, the input models include data such as, but not limited to, time series data that captures variations across time (e.g. profits, book sales, marketing campaigns), spatial data that indicates variation across location (e.g. book sales in different regions), or spatial-temporal data that combines both time series data and spatial data (e.g. book sales across time in different regions). The raw input data contained or otherwise made accessible by the input model 110 may be provided in the form of numeric values for specific parameters across time and space, but the raw input data may also contain alphanumeric symbols, such as the Resource Description Framework (RDF) notation used in the semantic web, or as the content of database fields. The input model 110 may be created manually or automatically by machine learning and data mining algorithms. Furthermore, the input model comprises a plurality of rules, wherein the plurality of rules are a combination of features and values that characterize the nodes from the plurality of nodes and the subset of edges from the plurality of the edges of the input model.

In some examples, the data analyzer 102 may be configured to input a domain model 114. A domain model is a representation of information about the domain. For example a domain model may contain an ontology that specifies the kinds of objects and concepts and the like that may exist in the domain in concrete or abstract form, properties that may be predicated of the objects and concepts and the like, relationships that may hold between the objects concepts and the like, and representations of any specific knowledge that is required to function in the domain. In some example multiple domain models may be provided for a single domain. Example domains may include, but are not limited to, sales, marketing, medical, oil and gas, industrial, weather, legal, financial and/or the like. In some examples, a domain model may provide instructions regarding aggregating, pruning, ordering and/or the like.

The data interpretation engine 106 is configured to process data from the input model by determining an importance level for one or more paths, using the importance determination engine 116, by comparing the importance level associated with each path of the plurality of paths in an input model with received threshold parameters 112. The importance determination engine 116 may identify the path of maximal significance based on the received threshold parameters 112, wherein the path of maximal significance is a path from the plurality of paths that exceeds the received threshold parameters. For example, FIGS. 2b and 6 represents maximal path 610.

In some example embodiments, the data interpretation engine 106 may be configured to determine the importance of the one or more detected patterns in the data, such as by using the domain model 114. The importance determination engine 116 may assign an importance level based on the pattern itself (e.g. magnitude, duration, rate of change or the like), defined threshold parameters (e.g. defined thresholds or tolerances), temporal relationships between the pattern in the data and patterns in other related data and/or the like. For example, books sales in London over 200 k may be assigned a high level of importance. In some examples, the patterns and/or the constraints may be defined by the domain model 114, the user or the like.

In some examples, the one or more paths may be marked as significant paths based on the domain model 114. For example, paths in the related data path that have an importance level above a predetermined threshold defined by the domain model 114 may be marked as significant. In some example embodiments, unexpected paths are also categorized as significant as they are suggestive of a particular condition or fault. Other paths may be determined to be significant based on data anomalies, data marked as neither expected nor unexpected that satisfy an importance level, and/or the like. Furthermore, significant paths may be determined by a user. For example, a user may set a spending threshold to a particular amount per month in order to manage finances.

The one or more significant paths may be input into the importance determination engine 116 and the natural language generation system 108 to enable the generation of a visualization and/or one or more phrases.

In some example embodiments, the importance determination engine 106 is configured with the data pruner 118 to prune data and with the data arranger 120 to collapse data. Pruning and collapsing may be based on rules wherein in the instance when a rule among a plurality of rules does not meet a predetermined threshold parameter from the threshold parameters 112, it is determined that the subset of nodes and the subset of edges in which the rules were run against are determined insignificant. In some examples and, as shown in FIG. 6, the maximal path 610 is represented by UK-London-Books→=2. The pruned path 612 eliminates the node representing age so that the pruned path UK-London-Books is used. The collapsed path 614 is represented by London-Books. Accordingly, a collapsed path represents the nodes that are deemed significant and relate to a causal explanation.

Furthermore, the collapsed path containing nodes is mapped to phrases as depicted in FIG. 7a, such as by the natural language generation engine 108. In some examples, the node London is mapped to "published in London," and node Books is mapped to "books." In the reordering process 712, the nodes are reordered to "books published in London." This process of reordering is done based on coherency to generate a coherent narrative.

In some examples, multiple paths may be used. For example, paths describing USA and Pens can be combined to state "in general, products manufactured in the USA did poorly, however pens saw an increase of . . . ." In other examples, certain nodes may be complemented by visualizations. For example, highlighting may be used to display how significant a difference there is between options.

In some examples, the data interpretation engine 106 is further configured to identify the subset of nodes from the plurality of nodes and the subset of edges from the plurality of edges associated with the path of maximal significance based on a hierarchical relationship among a plurality of rules, wherein each of the plurality of rules comprises threshold parameters and an action to be executed if the threshold parameters are met.

In some example embodiments the system 100, is configured to split the plurality of paths to produce different subsets and generate the one or more phrases describing the plurality of paths of the different subsets. In addition, the one or more phrases are generated by mapping the subset of nodes and the subset of edges into the one or more phrases, grouping and aggregating the subset of nodes and the subset of edges, and ordering the nodes based on coherency. Furthermore, the grouping and aggregating the subset of nodes and the subset of edges comprises generating a single phrase describing the subset of nodes and the subset of edges. This grouping and aggregating may be based on identified similarities between nodes.

In some examples, the data interpreter 104 may further be configured to instantiate a plurality of messages by mapping the nodes and edges, such as by mapping a collapsed path, pruned path, and/or maximal path to a message. In one example, a collapsed path containing "London" and "Book" may be mapped to a natural language word, phrase, sentence or the like (hereinafter "sensible language") "published in London" and "books" in order to generate, for example, an output comprising of "the largest gain in sales was driven by books published in London which saw an X % increase." In order to determine the one or more messages, the importance level of each of the messages and relationships between the messages, the data interpreter 104 may be configured to access the domain model 114 directly or indirectly via the data analyzer 102 or the like.

In some example embodiments, transforming the input data into a single phrase is based on, for example, the nodes associated with mapped phrases "published in London" and "books" and their associated feature-value pairs. In some embodiments, the selected feature-value pairs may indicate the highest contribution to the gain in sales identified. In some example embodiments and as described further below, the natural language generation system 108 may comprise a realizer configured to apply a realization process to each feature-value pair. In some example embodiments, the realizer is configured to use data from the domain model 114 via the data interpreter 104, the data from the domain model 114 may in some embodiments specify domain specific syntactic expressions characterizing one or more domain-specific ordering of data, relationships between data, anomalous behaviors related to data and/or the like.

In some example embodiments, the feature-value pairs may depend on each other. As used herein, the feature-value pairs and their position may be further based on a set of sensible language rules such that, for example, if the feature value pairs to be transformed into a causal explanation are product type-book and region-London, the resulting generated causal explanation phrase may be "books produced in London" rather than "books published in London." In this case, the feature-value pair product type-book is influenced by an ordering principle derived from the domain model 114 having a syntax which may provide rules for domain-specific ordering of data. In some embodiments, a realizer, such as the realizer described herein, is configured to use the valid feature-value positioning provided by data in the domain model 114 to establish rules defining how the feature-value pairs relate and their valid positioning.

In some examples, messages are language independent data structures that correspond to informational elements in a text and/or collect together underling data in such a way that the underlying data can be linguistically expressed. In some examples, messages are created based on a requirements analysis as to what is to be communicated for a particular scenario (e.g. for a particular domain). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but also the user wants to know changes in speed over time, warm or cold fronts, geographic areas and or the like. In some cases, users do not even want to know wind speed, they simply want an indication of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein. In some examples, the messages may be grouped and aggregated. In further examples, the domain model 114 may dictate messages are to be reordered, such as in a document planner to deliver a coherent narrative.

In some example embodiments a natural language generation system, such as natural language generation system 108, is configured to generate phrases, sentences, text or the like which may take the form of natural language annotations. Other linguistic constructs may be generated in some example embodiments. The natural language generation system 108 may comprise a document planner, a microplanner and/or a realizer. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner is configured to input the one or more patterns from the data interpreter in the form of messages and determine how to use those messages to describe the patterns in the one or more data channels derived from the raw input data. The document planner may comprise a content determination process that is configured to select and order the messages. The document planner may also comprise a structuring process that determines the order of messages.

In some example embodiments, the document planner may access one or more text schemas for the purposes of content determination and document structuring. A text schema is a rule set that defines the order in which a number of messages are to be presented in a document. For example, an event (e.g. medication injection) may be described prior to a key pattern (e.g. rise in heart rate). In other examples, a pattern (e.g. falling or steady respiratory rate) may be described after, but in relation to, a description of another pattern (e.g. rise in heart rate). The output of the document planner may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related to each other.

The microplanner is configured to modify the document plan from the document planner, such that the document plan may be expressed in natural language. In some example embodiments, the microplanner may perform aggregation, lexicalization and referring expression generation. In some examples, aggregation includes, but is not limited to, determining whether two or more messages can be combined together linguistically to produce a more complex sentence (e.g., a path including both "product price>£500" and "special edition" (two messages) could be mapped into a single message describing luxury items.). For example, one or more key patterns may be aggregated so that both of the key patterns can be described by a single sentence. Alternatively or additionally, aggregation may not be performed in some instances so as to enable stand-alone interpretation if a portion of the natural language text is shown as an annotation independently on a graphical output.

In some examples, lexicalization includes, but is not limited to, choosing particular words for the expression of concepts and relations. In some examples, referring expression generation includes, but is not limited to, choosing how to refer to an entity so that it can be unambiguously identified by the reader. The output of the microplanner, in some example embodiments, is a tree-structured realization specification whose leaf-nodes are sentence plans, and whose internal nodes express rhetorical relations between the leaf nodes.

The realizer is configured to traverse the tree-structured realization specification to express the tree-structured realization specification in natural language. The realization process that is applied to each sentence plan makes use of a grammar which specifies the valid syntactic structures in the language and further provides a way of mapping from sentence plans into the corresponding natural language sentences. The output of the process is, in some example embodiments, a well-formed natural language text. In some examples, the natural language text may include embedded mark-up. The output of the realizer, in some example embodiments, is the natural language annotations that are configured to be on or in proximity to a graphical output. The realizer may also output situational analysis text or a narrative that is configured to describe or otherwise summarize the one or more key patterns, the one or more significant patterns, the one or more contextual channels, and/or the one or more events to be displayed in the graphical output. Alternatively or additionally, the natural language annotations and/or the narrative may describe data that is not included on the graph to provide additional situational awareness.

In some examples, the data interpretation engine 106 may be further configured to instantiate a plurality of messages by mapping the nodes and edges, such as by mapping a collapsed path, pruned path, and/or maximal path to a message. In one example, a collapsed path containing "London" and "Book" may be mapped to nodes "published in London" and "books." The process of collapsing braches may comprise of rules based on proper arrangement and hierarchy of nodes. It can be understood that a proper arrangement can be related to the arrangement of words in proper grammatical progression and a hierarchy comprising affinity values corresponding to geography (e.g. London), time (Fall), etc. In order to determine the one or more messages, the importance level of each of the messages and relationships between the messages, the data interpreter 104 may be configured to access the domain model 114 directly or indirectly via the data analyzer 102 or the like.

In some examples, the one or more phrases correspond to informational elements in a text and/or collect together underling data in such a way that the underlying data can be linguistically expressed. In some examples, the one or more phrases are created based on a requirements analysis as to what is to be communicated for a particular scenario (e.g. for a particular domain).

In some examples, a visualizer is configured to generate visualizations based upon a subset of nodes from the tree structure. One example of a visualization is shown with respect to FIG. 7b.

FIG. 3 is an example block diagram of an example computing device for practicing embodiments of an example causal explanation system. In particular, FIG. 3 shows a computing system 300 that may be utilized to implement a causal explanation system 100 having a data analyzer 102, a data interpreter 104, a data interpretation engine 106, a natural language generation system 108 and/or a user interface 310. One or more general purpose or special purpose computing systems/devices may be used to implement the data analyzer 102, the data interpreter 104, the data interpretation engine 106, the natural language generation system 108 and/or the user interface 310. In addition, the computing system 300 may comprise one or more distinct computing systems/devices and may span distributed locations. For example, in some embodiments, the natural language generation system 108 may be accessible remotely via the network 350. In other example embodiments, one or more of the data analyzer 102, the data interpreter 104, the data interpretation engine 106, the natural language generation system 108 and/or the user interface 310 may be configured to operate remotely. In some example embodiments, a pre-processing module or other module that requires heavy computational load may be configured to perform that computational load and thus may be on a remote device or server. For example, the data analyzer 102 and/or the data interpreter 104 may be accessed remotely. Furthermore, each block shown may represent one or more such blocks as appropriate to a specific example embodiment. In some cases one or more of the blocks may be combined with other blocks. Also, the data analyzer 102, the data interpreter 104, the data interpretation engine 106, the natural language generation system 108 and/or the user interface 310 may be implemented in software, hardware, firmware, or in some combination to achieve the capabilities described herein.

In the example embodiment shown, computing system 300 comprises a computer memory ("memory") 301, a display 302, one or more processors 303, input/output devices 304 (e.g., keyboard, mouse, CRT or LCD display, touch screen, gesture sensing device and/or the like), other computer-readable media 305, and communications interface 306. The processor 303 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 303 comprises a plurality of processors. The plurality of processors may be in operative communication with each other and may be collectively configured to perform one or more functionalities of the graphical annotation environment as described herein.

FIGS. 4 and 5 illustrate example flowcharts of the operations performed by an apparatus, such as computing system 300 of FIG. 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 301 of an apparatus employing an embodiment of the present invention and executed by a processor 303 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of FIG. 4 and define an algorithm for configuring a computer or processor, to perform an example embodiment. In some cases, a general purpose computer may be provided with an instance of the processor which performs the algorithm of FIGS. 4 and 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIG. 4). It should be appreciated that each of the modifications, optional additions or amplifications described herein may be included with the operations herein either alone or in combination with any others among the features described herein.

FIG. 4 is a flow chart illustrating an example method for generating a textual output and/or a visualization that is configured to be output or otherwise displayed on a user interface. In block 402 the data analyzer 102 is configured to obtain an input model, such as input model 110, representing a data set composed of a plurality of nodes, a plurality of edges, and a plurality of paths. In some embodiments, the input model is created manually or automatically by machine learning and data mining algorithms that infers values of the raw input data. In some example embodiments, the data set composed of the plurality of nodes, the plurality of edges, and the plurality of paths may take the form of a tree model. The data set may also be referred to, in some examples, as a tree data structure. For example, the data set may relate to sales for a particular bookseller within a specific year. In this example, the data set may relate to inventory data comprising of an item description, number of sales in the current time period, number of sales the last time period, the difference between number of a sales in a comparison period and number of sales in the current time period, the geographic location associated with the item sale such as, for example, state, country, and region, item type, and item age based on for example, the release date of the item. An illustrative example of a representative data set is shown in FIG. 2a.

In some examples, the data set composed of the plurality of nodes, the plurality of edges, and the plurality of paths in the form of the tree model may be characterized as combinations of features and values. In some example embodiments, a combination of features and values characterize a subset of nodes from the plurality of nodes and a subset of edges from the plurality of edges in the input model. In some example embodiments, the features and values are also referred to as feature-value pairs. For example, the feature named number might have the value singular. Each feature-value pair associates a feature with a value, for example and as depicted in the tree model 214 in FIG. 2b, the following feature-value pairs, derived from data set 200a of FIG. 2a include: country-UK, country-USA, state-London, state-Grampian, type-pens, type-books, age-→=2, and the like. As described above, the nodes represent content and the edges between the nodes represent a relationship between the nodes.

In block 404, the data analyzer 102 is configured to receive threshold parameters from threshold parameters 112. In some example embodiments, the received threshold parameters may comprise at least one predefined threshold defining the limits of the threshold parameters during normal operation and/or at least one predefined tolerance threshold value. In some example embodiments, the domain model 114 may provide data limits related to normal operation in a domain (e.g. normal ranges), information related to anomalous behaviors and/or the like. Alternatively or additionally, a user of the system may be permitted to change values of existing predefined parameters or add new parameters. For example, a threshold may be assigned based on a sales value over particular period of time. In some examples, this may be sales over $20,000.

In block 406, the importance determination engine 116, the processor or the like may assign an importance level value to the plurality of paths corresponding to the data set of the input model based on one or more of detected patterns (e.g. trend, spike, magnitude, duration, rate of change or the like), defined threshold parameters (e.g. defined thresholds or tolerances), temporal relationships between the patterns in the data and patterns in other related data and/or the like from the domain model 114. Alternatively or additionally, a pattern in data from the input model may be defined as a significant in an instance in which the pattern exceeds or otherwise satisfies a predefined importance level or causes an alarm condition. The related data may be included based on detection of anomalous, unexpected or otherwise flagged behavior in the related data. In some examples, the related data is compared to data from the input model over a similar period of time. For example, data in the input model comprising books sales in London over 200 k may be assigned a high level of importance based on a comparison of book sales the previous ten years.

For example, the importance determination engine 116, the processor or the like may assign an importance level to the plurality of feature-value pairs based on a value related to a highest contribution to an increase of inventory sales. In some example embodiments, the importance determination engine 116, the processor or the like may, in this example embodiment, may select the node 210 with content UK and its associated feature-value pair country-UK.

In block 408, the importance determination engine 116, the processor or the like may split the plurality of paths to produce different subsets such as the subset of nodes and the subset of edges. In some example embodiments, the importance determination engine 116, the processor or the like may split the data set based on the selected feature-value pair. In other words, the feature-value pairs country-UK and country-USA and their values, related to the highest contribution to an increase of inventory sales, is removed or split off from the remaining data set so as to find a second or subsequent feature-value pair with the highest value related to the highest contribution to the increase of inventory sales from the remaining feature-value pairs.

By way of example, FIG. 2b shows branch nodes London and Grampian from UK node, the London node associated with feature-value pair state-London, and the Grampian node associated with feature-value pair state-Grampian. Based on the remaining set of data in this example, the importance determination engine 116, the processor or the like may determine the second feature-value pair with the highest value related to the highest contribution to the increase of the inventory sales is state-London. In some example embodiments, the importance determination engine 116, the processor or the like is configured to perform the process of determining, selecting, and splitting the feature-value pair with the highest value related to the highest contribution to the increase of inventory sales iteratively so as to repeat the determining, selecting, and splitting of nodes. The feature-value nodes with the highest contribution to the increase of inventory sales that results comprises at least a greater percentage of data associated with the highest contribution to the increase of inventory sales.

In block 410, the importance determination engine 116, the processor or the like is configured to identify the path of maximal significance from the plurality of paths. Continuing with the example above, the plurality of paths represent all of the feature-value pairs derived from the input model. As shown in FIG. 2b the path 214 is associated with the identified feature-value pairs with the highest contribution to the increase of inventory sales. In some example embodiments, the path 214 as determined by the importance determination engine 116, the processor or the like is the path with the highest contribution to the increase of inventory sales. In this example, the path 214 is identified as the path of maximal significance from the plurality of paths depicted in FIG. 2b. In some example embodiments, the identified path of maximal significance may be based upon the received threshold parameters, wherein the identified path of maximal significance may be a path from the plurality of paths that exceeds the received threshold parameters. In some example embodiments, the identified path of maximal significance may be a path from the plurality of paths having an importance level that exceeds the received threshold parameters.

The importance determination engine 116, the processor or the like is configured to compare an importance level associated with each path of the plurality of paths in the input model with the received threshold parameters. In some examples, the importance level associated with each path may be defined based on the domain model 114.

The data interpreter 104 may access the domain model 114 directly or indirectly via the data analyzer 102 or the like. As previously mentioned, the domain model 114 may contain information related to a particular domain or industry. In some examples, the domain model 114 may provide data limits related to normal behaviors in a domain (e.g. normal ranges) and/or information related to anomalous behaviors and/or the like.

In block 412, the data interpretation engine 106 is further configured to identify the subset of nodes and the subset of edges associated with the path of maximal significance. In some embodiments, identifying the subset of nodes from the plurality of nodes and the subset of edges from the plurality of edges associated with the path of maximal significance is based on a hierarchical relationship among a plurality of rules. As disclosed above, the plurality of rules are a combination of features and values that characterize the subset of nodes from the plurality of nodes and the subset of edges from the plurality of edges of the input model. In some example embodiments, each of the plurality of rules comprises threshold parameters and an action to be executed if the threshold parameters are met. In some embodiments, the data interpretation engine 106 may process the data from the input model by determining an importance level for the one or more paths of the input model using the importance determination engine 116, wherein the importance level for each of the one or more paths is compared with the received threshold parameters 112. In some embodiments, the path of maximal significance is a path that exceeds the received threshold parameters 112.

FIG. 6 displays an example path of maximal significance 610 represented by UK-London-Books→=2. The example path of maximal significance 610 comprises the feature-value pairs with values with the highest contribution to the increase of inventory sales.

In some example embodiments, the path of maximal significance 610 may be further reduced, using the data pruner 118, by eliminating nodes that provide lesser significance in understanding causal explanations. In some example embodiments, the data interpretation engine 106, the processor or the like may be configured to eliminate the feature-value node based on a determination that the feature-value node's importance value does not meet a threshold criteria derived from the threshold parameters 112. For example, a threshold criteria requires that the importance value must be associated with a percentage of increase greater than 0.6 percentage. The data interpretation engine 106, the processor or the like retrieves the threshold criteria from the threshold parameters 112 determines that node 610 and its associated importance value is not greater than 0.6 percentage and as such, node 610 is eliminated.

FIG. 6 displays such pruning process results in which the node 610 is eliminated so that the pruned path 612 represented by UK-London-Books remains. In some example embodiments, the pruned path 612 may be further reduced, using the data arranger 120 to collapse nodes so that focus is given to a single branch of the tree structure. FIG. 6 displays such collapsing process results in which the node representing country is eliminated so that the collapsed path 614 represented by London-Books remains. In some example embodiments, the node representing country is eliminated based on grouping nodes together where one node infers the other, the feature-value country-UK is associated with feature-value region-London.

In some example embodiments, the natural language generation system 108, the realizer, the processor or the like may be configured to use collapsed path 614 representing the nodes that are deemed significant and provide a greater narrative to transform the remaining path of nodes into a causal explanation. For example, FIG. 7a depicts the collapsed path 614 containing nodes mapped to phrases. In some example embodiments, the natural language system 108 is configured to extract and exploit contextual information provided by the domain model 114 for phrase mapping. In some examples, the node London is mapped to "published in London," and node Books is mapped to "books" as represented by node mapping process 710. In some embodiments, the natural language system 108 is configured to reorder the mapping. For example, in the reordering process 712, the nodes are reordered to "books published in London." This process of reordering is done based on coherency to generate a coherent, meaningful narrative. In some example embodiments, the natural language system 108, the realizer, the processor, or the like may be configured to perform lexicalization. In some example embodiments, lexicalization includes, but is not limited to, choosing particular words for the expression of concepts and relations. For example, the phrase "published in London" may be used to describe "produced in London" which may be used to describe the causal event.

In block 414, the importance determination engine 106 is configured to determine that a rule among the plurality of rules does not meet the threshold parameters. In some example embodiments, the rule that does not meet the threshold parameters causes no action to be taken such as the actions of generating the one or more phrases in which nodes and edges are mapped to the one or more phrases which are then grouped and aggregated and ordered for coherency in order to linguistically describe causal explanations of data.

In block 416, the data interpretation engine 106 is configured to determine that the subset of nodes from the plurality of nodes and the subset of edges from the plurality of edges are insignificant. In some example embodiments, the insignificant nodes and edges may undergo operations such as pruning and collapsing by the data pruner 118 and data arranger 120 as described herein.

In block 418, the data interpretation engine 106 may be configured to, using the natural language generation system 108, generate one or more phrases with a narrative representation describing the subset of nodes and the subset of edges associated with the path of maximal significance so as to highlight significant observable features of the data and/or explain or otherwise describe a cause for a specific data output, such as why sales have gone up or down. For example, a narrative causal explanation may be "The largest gain in sales was driven by books published in London which saw an X % increase."

In some examples, a visualizer is configured to generate visualizations based upon the subset of nodes as shown in block 412. Alternatively or additionally, the generated visualizations may be provided by the visualizer in conjunction with or in replacement of the generated one or more phrases with the narrative representation, such as, but not limited to, a map, a visual image, a chart and/or the like. One example visualization is shown with respect to FIG. 7b. FIG. 7b provides a bar graph visualization of data related to book item sales based on geographical region.

FIG. 5 is a flow chart illustrating an example method of actions to be executed if the threshold parameters are met, the actions include one or more of generating the one or more phrases in which nodes and edges are mapped to the one or more phrases which are then grouped and aggregated and ordered for coherency in order to generate a linguistically coherent narrative. For example, in block 504, the data interpreter 104 may be configured to instantiate a plurality of messages by mapping the subset of nodes and the subset of edges into the one or more phrases. In one example, a path containing "London" and "Book" may be mapped to nodes "published in London" and "books."

Alternatively or additionally, the data interpreter 104 may be further configured for grouping and aggregating the subset of nodes and the subset of edges, wherein the subset of nodes and the subset of edges comprises generating a single phrase describing the subset of nodes and the subset of edges (block 506). For example, a path containing "product price>£500" and another path "special edition" may be grouped and/or aggregated into a single message describing luxury items.

The data interpreter 104 and the natural language generation system 108 may be configured for ordering the nodes based on coherency (block 508). The ordering may lead to messages that tend to be more grammatical and semantically coherent, particularly when node languages are structurally dissimilar. In some example embodiments, grouping and ordering may be defined as part of the system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method for transforming an input causal model into a format that can be expressed causally in one or more phrases with a narrative representation of the input causal model, the method comprising:

obtaining, using at least one processor, the input causal model representing a data set composed of a plurality of nodes, a plurality of edges, and a plurality of paths, wherein the input causal model is created by machine learning and data mining algorithms, and wherein each node of the plurality of nodes representative of numerical or symbolic content and each edge of the plurality of edges representative of a causal relationship between nodes of the plurality of nodes, wherein a causal relationship identifies a relation between a cause and an effect;

identifying, using the at least one processor and by traversing each path of a plurality of paths of causally related nodes of the input causal model and determining an importance level for each path of the plurality of paths, a path of maximal significance of the plurality of paths;

identifying, by performing one or more of pruning or collapsing the path of maximal significance, using the at least one processor, a subset of nodes from the plurality of nodes and a subset of edges from the plurality of edges associated with the path of maximal significance, wherein pruning the path of maximal significance results in removal of nodes from the path of maximal significance and collapsing the path of maximal significance results in only those nodes of the plurality of nodes remaining in the subset of nodes that are deemed significant and relate to a causal explanation; and generating, using the at least one processor and a natural language generation system that is configured to execute on at least one processor, one or more phrases with a narrative representation describing the subset of nodes and the subset of edges associated with the path of maximal significance.

2. A method according to claim 1, further comprising:
    identifying, using the at least one processor, the path of maximal significance from the input model by:
    receiving, using the at least one processor, threshold parameters;
    assigning, using the at least one processor, an importance level to each path of the plurality of paths corresponding to the data set of the input causal model; and
    identifying, using the at least one processor, the path of maximal significance based upon the received threshold parameters, wherein the path of maximal significance is a path from the plurality of paths that at least an importance level that exceeds one or more of the received threshold parameters.

3. A method according to claim 1, wherein identifying the subset of nodes from the plurality of nodes and the subset of edges from the plurality of edges associated with the path of maximal significance is based at least in part on a hierarchical relationship among a plurality of rules, wherein each rule of the plurality of rules comprises threshold parameters and an action to be executed if the threshold parameters are met.

4. A method according to claim 3, further comprising:
    determining, using the at least one processor, that a rule among the plurality of rules does not meet the threshold parameters; and
    determining, using the at least one processor, that the subset of nodes from the plurality of nodes and the subset of edges from the plurality of edges are insignificant.

5. A method according to claim 3, wherein the plurality of rules are a combination of features and values that characterize the subset of nodes from the plurality of nodes and the subset of edges from the plurality of edges of the input causal model.

6. A method according to claim 1, further comprising:
    splitting, using the at least one processor, the plurality of paths to produce different subsets of paths such as the subset of nodes and the subset of edges.

7. A method according to claim 1, further comprising:
    generating, using the at least one processor, the one or more phrases by:
    mapping, using the at least one processor, the subset of nodes and the subset of edges into the one or more phrases;
    grouping, using the at least one processor, and aggregating the subset of nodes and the subset of edges; and
    ordering, using the at least one processor, the nodes based on coherency.

8. A method according to claim 7, wherein the grouping and aggregating the subset of nodes and the subset of edges comprises generating a single phrase describing the subset of nodes and the subset of edges.

9. A method according to claim 1, further comprising:
    generating, using the at least one processor, visualizations based upon the subset of nodes from the input causal model.

10. The method according to claim 1, wherein the one or more of pruning or collapsing the path of maximal significance is based on a predetermined inference relationship between at least a first feature value for a first node of the plurality of nodes and a second feature value for a second node of the plurality of nodes.

11. An apparatus that is configured to transform an input causal model into a format that can be expressed causally in one or more phrases with a narrative representation of the input causal model data, the apparatus comprising at least one processor and at least one memory including computer program code, the at least one memory and the computer program code configured to, with the at least one processor, cause the apparatus to at least:
  obtain an input causal model representing a data set composed of a plurality of nodes, a plurality of edges, and a plurality of paths, wherein the input causal model is created by machine learning and data mining algorithms, and wherein each node of the plurality of nodes representative of numerical or symbolic content and each edge of the plurality of edges representative of a causal relationship between nodes of the plurality of nodes, wherein a causal relationship identifies a relation between a cause and an effect;
  identify, by traversing each path of a plurality of paths of causally related nodes of the input causal model and determining an importance level for each path of the plurality of paths, a path of maximal significance of the plurality of paths;
  identify, by performing one or more of pruning or collapsing the path of maximal significance, a subset of nodes from the plurality of nodes and a subset of edges from the plurality of edges associated with the path of maximal significance, wherein pruning the path of maximal significance results in removal of nodes from the path of maximal significance and collapsing the path of maximal significance results in only those nodes of the plurality of nodes remaining in the subset of nodes that are deemed significant and relate to a causal explanation; and
  generate, using a natural language generation system that is configured to execute on a processor, one or more phrases with a narrative representation describing the subset of nodes and the subset of edges associated with the path of maximal significance.

12. An apparatus according to claim 11, wherein the at least one memory including the computer program code is further configured to, with the at least one processor, cause the apparatus to identify the branch of maximal significance from the input causal model by:
  receiving threshold parameters;
  assigning an importance level to each path of the plurality of paths corresponding to the data set; and
  identify the path of maximal significance based at least in part on the received threshold parameters, wherein the path of maximal significance is a path from the plurality of paths that exceeds the received threshold parameters.

13. An apparatus according to claim 11, wherein identifying the subset of nodes from the plurality of nodes and the subset of edges from the plurality of edges associated with the path of maximal significance is based on a hierarchical relationship among a plurality of rules, wherein each of the plurality of rules comprises threshold parameters and an action to be executed if the threshold parameters are met.

14. An apparatus according to claim 13, wherein the at least one memory including the computer program code is further configured to, with the at least one processor, cause the apparatus to:
  determine that a rule among the plurality of rules does not meet the threshold parameters; and
  determine that the subset of nodes from the plurality of nodes and the subset of edges from the plurality of edges are insignificant.

15. An apparatus according to claim 13, wherein the plurality of rules are a combination of features and values that characterize the subset of nodes from the plurality of nodes and the subset of edges from the plurality of edges of the input causal model.

16. An apparatus according to claim 11, wherein the at least one memory including the computer program code is further configured to, with the at least one processor, cause the apparatus to:
  split the plurality of paths to produce different subsets.

17. An apparatus according to claim 11, wherein the at least one memory including the computer program code is further configured to, with the at least one processor, cause the apparatus to generate the one or more phrases by:
  mapping the subset of nodes and the subset of edges into the one or more phrases;
  grouping and aggregating the subset of nodes and the subset of edges; and
  ordering the nodes based on coherency.

18. An apparatus according to claim 17, wherein the grouping and aggregating the subset of nodes and the subset of edges comprises generating a single phrase describing the subset of nodes and the subset of edges.

19. An apparatus according to claim 11, wherein the at least one memory including the computer program code is further configured to, with the at least one processor, cause the apparatus to:
  generate visualizations based upon the subset of nodes from the input causal model.

20. A computer program product comprising at least one computer readable non-transitory memory medium having program code instructions stored thereon, the program code instructions which when executed by an apparatus causes the apparatus to at least:
  obtain an input causal model representing a data set composed of a plurality of nodes, a plurality of edges, and a plurality of paths, wherein the input causal model is created by machine learning and data mining algorithms, and wherein each node of the plurality of nodes representative of numerical or symbolic content and each edge of the plurality of edges representative of a causal relationship between nodes of the plurality of nodes, wherein a causal relationship identifies a relation between a cause and an effect;
  identify, by traversing each path of a plurality of paths of causally related nodes of the input causal model and determining an importance level for each path of the plurality of paths, a path of maximal significance of the plurality of paths;
  identify, by performing one or more of pruning or collapsing the path of maximal significance, a subset of nodes from the plurality of nodes and a subset of edges from the plurality of edges associated with the path of maximal significance, wherein pruning the path of maximal significance results in removal of nodes from the path of maximal significance and collapsing the path of maximal significance results in only those nodes of the plurality of nodes remaining in the subset of nodes that are deemed significant and relate to a causal explanation; and generate, using a natural language generation system that is configured to execute on a processor, one or more phrases with a narrative representation describing the subset of nodes and the subset of edges associated with the path of maximal significance.

\* \* \* \* \*